United States Patent [19]
Wooster et al.

[11] Patent Number: 6,023,680
[45] Date of Patent: Feb. 8, 2000

[54] METHODS, APPARATUS AND COMPUTER PROGRAM PRODUCTS FOR AUTOMATED VISUAL INSPECTION

[75] Inventors: Andrew Wooster, Raleigh; Shantanu Deo, Durham, both of N.C.

[73] Assignee: Panasonic Technologies, Inc., Durham, N.C.

[21] Appl. No.: 08/857,199

[22] Filed: May 15, 1997

[51] Int. Cl.[7] .................................................. G06F 17/60
[52] U.S. Cl. ................................................................. 705/7
[58] Field of Search ........................... 705/7, 8; 382/141, 382/145, 147, 148, 149, 150; 348/126

[56] References Cited

U.S. PATENT DOCUMENTS

| | | | |
|---|---|---|---|
| 4,771,468 | 9/1988 | Batchelder et al. | 382/149 |
| 4,809,308 | 2/1989 | Adams et al. | 378/98.2 |
| 4,858,147 | 8/1989 | Conwell | 706/19 |
| 5,155,679 | 10/1992 | Jain et al. | 364/468.13 |
| 5,253,327 | 10/1993 | Yoshihara | 706/19 |
| 5,272,638 | 12/1993 | Martin et al. | 455/456 |
| 5,274,742 | 12/1993 | Morita et al. | 706/19 |
| 5,293,025 | 3/1994 | Wang | 219/121.71 |
| 5,343,388 | 8/1994 | Wedelin | 705/8 |
| 5,371,690 | 12/1994 | Engel et al. | 382/151 |
| 5,406,289 | 4/1995 | Barker et al. | 342/96 |
| 5,418,953 | 5/1995 | Hunt et al. | 395/672 |
| 5,465,221 | 11/1995 | Merat et al. | 702/83 |
| 5,467,268 | 11/1995 | Sisley et al. | 705/9 |
| 5,535,303 | 7/1996 | Ekchian et al. | 706/26 |

FOREIGN PATENT DOCUMENTS

| | | |
|---|---|---|
| 0 718 623 A2 | 12/1995 | European Pat. Off. . |
| 0 718623 | 6/1996 | European Pat. Off. . |
| WO96 00954 | 1/1996 | WIPO . |

OTHER PUBLICATIONS

Ruegsegger S M: "Intelligent Scheduling Optimization Using a Rule–Based Artificial Neural Network", Proceedings of the National Aerospace and Electronics Conference (NAECON), Dayton, May 24–28. 1993, vol. 2 May 1993.

Merat F L et al: "Automatic Inspection Planning Within a Feature–Based CAD System", *Robotics and Computer Integrated Manufacturing*, vol. 9, No. 1. 1992.

Reeves, C., et al, Modern Heuristic Techniques for Combinatorial Problems, Chp. 1, Introduction, pp. 1–19, 185, 249–255, 259–265, 268–269, 275–279 (Halstead Press 1993).

Mahon, Harris and Vernon, Automated Visual Inspection of Solder Paste Deposition on Surface Mount Technology PCB's, Computers in Industry 12, pp. 31–42 (1989).

E. Kosiba et al., Discrete event sequencing as a Traveling Salesman Problem, Computers in Industry 19, pp. 317–327 (1992).

S. Kirkpatrick et al., Optimization by Simulated Annealing, Computer Science/Engineering Technology, RC 9355 (#41093), pp. 1–73, 38–42 (Apr. 2, 1982).

T. Grossman et al., Computational Experience with Approximation Algorithms for the Set Covering Problem, pp. 1–16, 3–5 (Apr. 18, 1996).

(List continued on next page.)

*Primary Examiner*—Emanuel Todd Voeltz
*Assistant Examiner*—Alexander Kalinowski
*Attorney, Agent, or Firm*—Alston & Bird LLP

[57] ABSTRACT

Methods, apparatus and computer program products for automated visual inspection of regions of interest of a product utilizing an automated visual inspection device having a constrained viewing area are provided according to the present invention. Particularly, inspection of regions of interest on a product utilizing a constrained viewing area characterized as a view minimization problem is minimized by translating the view minimization problem into a set-covering problem and a traveling salesman problem. Known heuristics are applied to the set-covering problem and the traveling salesman problem to minimize the number of views required to view the regions of interest and to minimize the distance of travel between the views. Apparatus and computer programs products are also provided which minimize inspection time in a like manner.

25 Claims, 8 Drawing Sheets

OTHER PUBLICATIONS

J. Hopfield et al., Neural Computation of Decisions in Optimization Problems, Biol. Cybern. 52, pp. 141–152 (1985).

F. Lin, et al, Applying the Genetic Approach to Simulated Annealing in Solving Some NP–Hard Problems, IEEE Transactions on Systems, Man. and Cybernetics, vol. 23, No. 6 (Nov./Dec. 1993).

Kyushu Matsushita Electric Co., Ltd., Standard Specification, Visual Checker, Model: VC32C–M,L, Create Sophisticated, Human Friendly, SMT High Density Chip Mounting System, Ver. No. 940314.

O. Jeon, *Efficient Inspection Path Planning Algorithm,* Thesis, Case Western Reserve University (Aug. 1990).

Mahon, Harris and Vernon, "Automated Visual Inspection of Solder Paste Deposition on Surface Mount Technology PCB's", Computers in Industry, pp. 31–42, 1989.

T. Grossman et al., "Computational Experience with Approximation Algorithms for the Set Covering Problem", pp. 1–16, Apr. 18, 1996.

C. Reeves et al., "Modern Heuristic Techniques for Combinatorial Problems", pp. 1–19, 185, 249–255, 259–265, 268–269, 275–279, 1993.

METHODS, APPARATUS AND COMPUTER PROGRAM PRODUCTS FOR AUTOMATED VISUAL INSPECTION

FIELD OF INVENTION

The present invention relates to inspection of products, and more particularly to automated visual inspection.

BACKGROUND OF THE INVENTION

Various product inspection apparatus and methods are utilized in industrial, manufacturing and research settings for the inspection of end products for flaws and defects to insure product quality. Visual inspection is one type of product inspection utilized in industrial and manufacturing quality control. Certain visual inspection methods and apparatus test for cosmetic integrity utilizing visual inspection machines or the human eye. Cosmetic integrity inspection differs from another type of inspection, inspection for functional integrity, which can be tested using electronic probes.

Human inspection for cosmetic integrity deteriorates in quality as the human eye is distracted by the repetition and exacting nature of visual inspection. The costs and inaccuracies associated with human inspection and the increase in automated manufacturing systems have contributed to the increase in interest in automated visual inspection machines and methods.

Automated visual inspection machines generally have been designed having a viewing device, for example an optical input device, utilized to acquire images of the product being inspected. These optical input devices typically include devices such as charge coupled device (CCD) cameras or laser sensors. The images acquired by these optical input devices may be processed using artificial intelligence algorithms seeking perturbations that indicate product defects or manufacturing flaws. Automated inspection has occurred with various methods including reference comparison and analysis of generic properties. Automated visual inspection has been utilized in inspecting electronics products and components including printed circuit boards (PCB). Such PCBs generally include a dielectric substrate having conductive traces printed therein. Integrated circuit components are mounted to the board providing an electrical connection with the conductive traces of the board. Inspection of various regions of the PCBs has been conducted including final post assembly inspection.

Automated visual inspection devices typically have had a limited or constrained viewing area for acquiring these images. Generally, the products or objects being inspected are larger than a single viewing area of the optical input device. The viewing area is therefore typically required to be moved relative to the product during inspection. Servo motors have been employed to move the product or the input device relative to one another in order to acquire images of product.

Some problems associated with controlling the movement of inspection machines have been described as route or path planning problems. Attempts to solve these problems have been concerned with planning an inspection route which avoids obstacles or collisions with objects being inspected. Such inspection path planning problems have been attempted as seeking solutions to combinatorial problems. Combinatorial problems are problems in which the decision variables are discrete, i.e. where the solution is a set or a sequence or integers or other discrete objects. A discussion of combinatorial problems can be found in Reeves, C., *Modern Heuristic Techniques for Combinatorial Problems,* Chp. 1, Reeves, C. and Beasley, J., *Introduction,* pp. 1–19 (Halstead Press 1993) the disclosure of which is hereby incorporated by reference.

The problem of finding optimal solutions to such combinatorial problems is known as combinatorial optimization. Examples of such combinatorial problems are the quadratic assignment problem, the zero-to-one knapsack problem, the set covering problem, the vehicle routing problem, and the like. Solving combinatorial problems generally involves searching among local optimum for the true or global optimum. Local optima can be found in relation to neighborhoods where moves or operations find a better solution in a neighborhood, thus providing a local optima with respect to the neighborhood. In some instances, a local optima is also a global optima. Techniques called heuristics have been utilized in seeking to solve or optimize such combinatorial problems. Such heuristics seek near optimal solutions at a reasonable computational cost. Heuristics often cannot guarantee an optimal solution or foretell the degree or proximity to optimality of a particular solution. Some combinatorial problems are inherently of exponential complexity, and referred to generally as "nondeterministic polynomial" or NP-hard problems.

In visual inspection of certain electronic components or products, path planning or routing optimization has been attempted by applying algorithms to optimization problems. For example, a traveling salesman in a plane problem was utilized for minimizing the time spent visiting each point from a predetermined list of inspection points generated from a CAD layout data. Mahon, Harris and Vernon, "Automated Visual Inspection of Solder Paste Deposition on Surface Mount Technology PCB's," Computers in Industry 12, pp. 31–42 (1989) ("Mahon, et al"). Mahon, et al. applied the Simulated Annealing algorithm for a suboptimal solution. Mahon, et al. however, described a process of inspection utilizing the recognition properties of inspection.

With respect to attempts of optimization of a control path for automated visual inspection, one prior strategy has been to divide an entire region or product surface into a uniformly spaced grid of viewing areas. For example, the product to be inspected can be divided into columns and views can be created preceding in a vertical direction along each column. All regions of interest are included in at least one viewing area. For example, each grid element is then inspected progressing through a row-by-row analysis regardless of the placement of objects of interest. This method may require traveling over an entire surface when only portions of the surface or inspection area contain objects of interest for inspection. Objects of interest in products tend to cluster together. This method was typically repeated for each level of magnification of inspection. Thus, this method results in wasted inspection time and increased operating wear on inspection equipment and increased labor, computational, operational and repair costs. Further, increases in inspection time multiply in automated manufacturing environments to reduce the rate of production and thereby lower output and productivity.

There is, therefore, a need to provide solutions to the problem of automated visual inspection of regions of interest utilizing a constrained view which reduces the time of inspection and which improves the route of inspection travel over products having discrete and dispersed regions of interest.

SUMMARY OF INVENTION

In view of the above limitations of existing apparatus and methods for automated visual inspection, an object of the invention is to provide automated visual inspection methods and apparatus and program products which can reduce or minimize the inspection time for regions of interest of a product inspected by a viewing device having a constrained view.

It is also an object to provide methods and apparatus for controlling the route of travel of an automated visual inspection machine having a constrained area.

These and other objects of the present invention are provided by methods, apparatus, and computer program products for automated visual inspection which translate a view minimization problem into two problems, the set covering problem and the traveling salesman problem to which known heuristics can be applied. Methods, apparatus and program products are provided which minimize or reduce the inspection time of automated visual inspection of regions of interest using a constrained viewing area. Particularly, methods, apparatus and computer programs products are provided which apply heuristics to the set covering problem and to the traveling salesman problem to minimize inspection time by minimizing the number of views $|V|$ required for viewing the regions of interest $R_n$ in the constrained viewing area of a viewing device and by minimizing time required to travel between the views according to the following Formula (I)

$$a*|V|+E^{i<|V|}c(V_{i+1}, V_i) \tag{I}$$

where a is the time required to process a single view, and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem.

In one aspect of the present invention, methods of automated visual inspection of regions of interest utilizing a viewing device, preferably an optical input device, having a constrained viewing area are provided. One embodiment of these methods comprises the following steps. First, the regions of interest on a product, component or other structure are identified by x,y coordinates corresponding to a grid defined by a horizontal x-axis and vertical y-axis. Second, a set covering is performed on these regions of interest to select a number of views in which each of the regions of interest are included, preferably only once. In performing the set covering, a number n of starting or initial views V is defined with one of the views $V_i$ corresponding to each of the regions of interest $R_n$. The location of each of the initial views $V_i$ is of a predetermined shape, such as a rectangular shape, defined by the x,y coordinates related to the x,y coordinates defining the regions of interest $R_n$ and a length and width defined by view length and width constraints. The methods, apparatus and program products provided by the present invention are applicable to all automated or motorized inspection devices with any polygonal shaped constrained region of view.

A heuristic is applied to a set of starting views V to select a number of views $|V|$ which include all regions of interest $R_n$. Preferably, this is the minimum number of views $|V|$ which contain all of the regions of interest $R_n$ in at least one view.

Having obtained a selected number of views $|V|$, a traveling salesman operation is performed on the selected views V to determine the desired path of travel required to move between each of the selected views V. A heuristic is applied to the traveling salesman operation to reduce, and preferably minimize, the time required to travel between each of the views V, preferably by selecting a path of the minimum distance which minimizes the time of movement between the views.

Both the set covering and traveling salesman problems have been shown to be NP-hard, and therefore may be intractable. It is difficult for an optimal solution to be found at reasonable computational costs for anything but the smallest problems. However, good suboptimal solutions can be found with reasonable effort. By applying heuristic strategies to the set covering and traveling salesman operations, near optimal solutions can be provided. Thus, methods, apparatus and computer program products of the present invention, which utilize existing heuristic strategies for solving the set covering and traveling salesman problems, can provide significant savings and development costs reducing the time and cost of developing optimization strategies for automated visual inspection.

In another aspect of the present invention, apparatus for automated visual inspection of regions of interest with a constrained viewing area can also be provided. One embodiment of the apparatus includes a viewing device having an image acquiring mechanism. The image acquiring mechanism includes a constrained image acquiring viewing area which is configured to view the regions of interests as described herein. The constrained viewing area and the regions of interest are operatively connected with means for moving the constrained viewing area relative to the regions of interest of the product for viewing during inspection. An apparatus can be provided with moving means which move either the product, the optical input device, or both in conducting automated visual inspection.

An apparatus further includes means for performing a set covering, as described herein, on the regions of interest to select the number of views $|V|$ for viewing the regions of interest in the constrained viewing area. Set covering performing means preferably comprise means for applying a heuristic to perform or solve the set covering as explained herein.

Further, an apparatus includes means for performing a relaxed traveling salesman operation on the selected views to select the desired path of travel, preferably having a minimum distance, between the selected views V. Traveling salesman performing means preferably comprises means for applying a heuristic to solve the traveling salesman operation as described herein.

A set covering performing means and a traveling salesman performing means together act as means for minimizing the time of inspection required by selecting a number of views and the minimum time required to travel between views according to Formula I.

$$a*|V|+E^{i<|V|}c(V_{i+1}, V_i) \tag{I}$$

where a is the time required to process a single view, and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem.

The set covering performing means and the relaxed traveling salesman performing means can be operatively connected with moving means. The viewing device and the regions of interest can be moved relative to one another by a selected path of an ordered list of coordinates generated by the set covering means and the traveling salesman performing means.

In a still further aspect of the present invention, computer program products are provided for controlling automated visual inspection of regions of interest with a viewing device having a constrained view. The computer program products have a computer readable storage medium having computer readable code means embodied in the medium. The computer readable program code means include computer readable program code means for performing a set covering on regions of interest and for applying a heuristic thereto to select a number of views, preferably a minimum number of views, for viewing the regions of interest in a constrained viewing area as described herein. Also, the computer program product includes computer readable program code means for performing a relaxed traveling salesman operation and for applying a heuristic to a traveling salesman operation for the selected views to select the desired path of movement between the selected views.

Heuristic applying means for both the set covering and a traveling salesman operation apply heuristics such that the inspection time is minimized by minimizing the time required to select a number of views |V| and minimum time required to travel between views according to Formula I.

$$a*|V|+E^{i<|V|}c(V_{i+1}, V_i) \quad (I)$$

where a is the processing time of a single view and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem. A computer program product also can be provided with computer readable program code means for generating a selected path of an ordered list of coordinates for controlling the relative movement between a viewing device and regions of interest to be inspected. The computer readable program code means generates the ordered list of coordinates corresponding to the coordinates of the views V selected by set covering computer readable program codes means and the coordinates of the path of travel between the selected views generated by traveling salesman performing computer readable program code means. The computer program products further can be provided with computer readable program code means for controlling the relative movement between the constrained viewing area of the viewing device and the regions of interest of the product according to a selected path.

The methods, apparatus and computer program products of the present invention therefore can provide suboptimal solutions to the view minimization problem which results in reduced or minimized inspection time for regions of interest with optical input devices having constrained viewing areas. Combinations of alternative embodiments can be provided for the methods, apparatus and computer program product where different heuristic or solution techniques are applied to solve or optimize a set covering problem and a traveling salesman problem.

A BRIEF DESCRIPTION OF THE DRAWINGS

DETAILED DESCRIPTION

Figure 1:
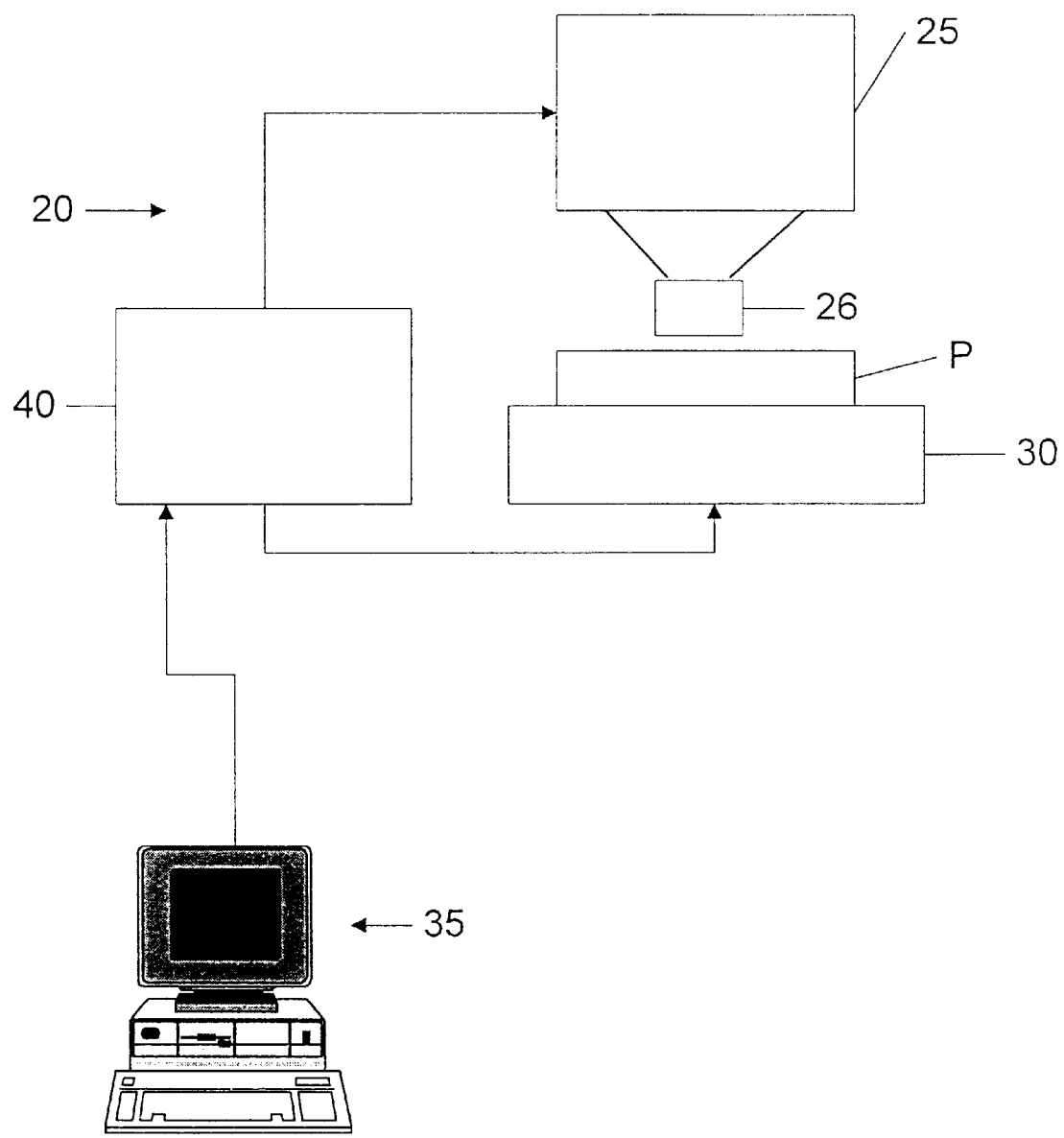
FIG. 1 is a diagram of an apparatus for automated visual inspection having a constrained viewing according to the present invention.

The present invention will now be described more fully hereinafter with reference to the accompanying drawings, in which preferred embodiments of the present invention are shown. This invention may, however, be embodied in many forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, automated visual inspection apparatus and/or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer-readable medium may be utilized including hard disks, CD-ROMs, optical storage devices, or magnetic storage devices.

The present invention is described below with reference to flowchart illustrations of methods, apparatus (systems) and computer program products. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring to FIGS. 1–7, the methods, apparatus and program products according to the present invention provide a solution, preferably an optimization of the view minimization problem. The view minimization problem is described herein as finding a set of views V whose members cover all regions of interest and minimizes the time required to inspect all objects of interest. This inspection time is the sum of the time required for each view and the time required to travel between views as described in Formula (I):

$$a*|V|+E^{i<|V|}c(V_{i+1}, V_i) \quad (I)$$

where a is the time required to process a single view, and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem.

Figure 2:
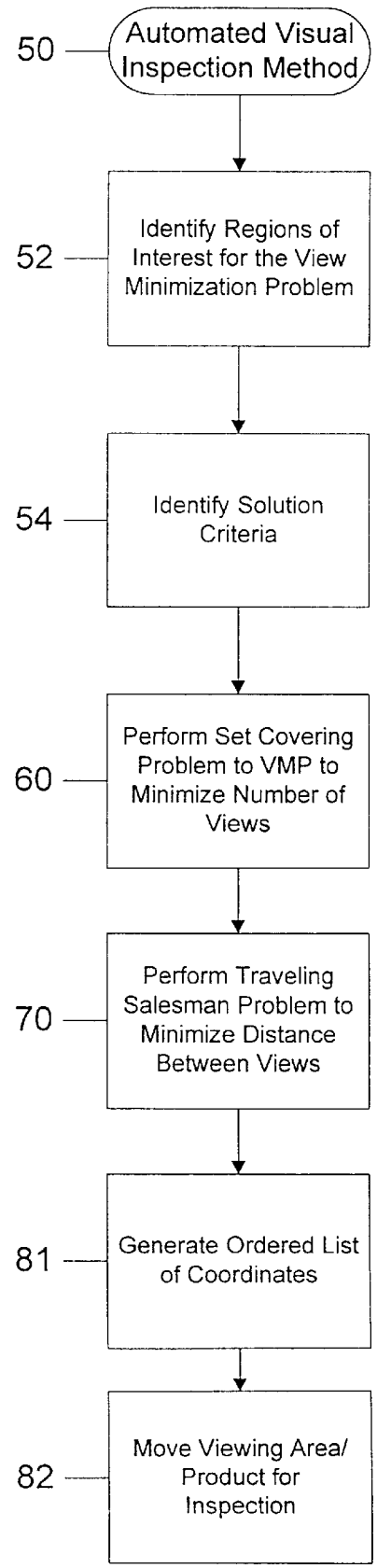
FIG. 2 is a flow chart illustrating one embodiment of the operations of automated visual according to the present invention.

The minimizing of Formula (I) above can be achieved by minimizing its two terms separately. That is, the view minimization problem can be described as solving or optimizing inspection time by reducing or minimizing both the number of views |V| (FIGS. 2 and 3, Box 60) and minimizing the touring distance between views $E^{i<|V|}c(V_{i+1}, V_i)$. The view minimization problem is optimized by transforming this view minimization problem into two subproblems, a set covering problem to minimize the number of views |V| (Box 60) and a traveling salesman problem to minimize the distance between the views (FIGS. 2 and 4, Box 70).

Referring now to FIG. 1, an automated visual inspection apparatus according to the present invention is illustrated. An automated visual inspection apparatus 20 may have a viewing device 25 positioned to view a product P having regions of interest $R_n$. The viewing device 25, preferably an optical input device, includes an image acquiring mechanism having a constrained image acquiring viewing area 26 which is configured to view regions of interest $R_n$ of the product P. The visual inspection apparatus 20 also includes a moving mechanism 30 or other means for moving either or both of the constrained viewing area of the viewing device 25 relative to regions of interest $R_n$ on the product P. The moving mechanism 30 is operatively connected with the viewing device 25. The apparatus 20 further includes a controller 40 which provides input to the viewing device 25 and the moving mechanism 30 for performing visual inspection. Still further, the controller 40 can also receive input including solution criteria from a user input device 35 which can be operatively connected with the controller 40.

The viewing device 25, illustrated as an optical input device, can be provided as various visual checkers, charge coupled device (CCD) cameras, laser sensors or viewing devices which are known to one of ordinary skill in the art and are not described in detail herein. In the embodiment of FIG. 1, the optical input device 25 is illustrated as a Panasonic Model VC32C-M,L visual checker manufactured and sold by the Kyushu Matsushita Electric Co., Ltd. of Fukoka, Japan. Additional information pertaining to the VC32C-M/L visual checkers can be obtained from the Panasonic Factory Automation group in Chicago, Ill. and at http://www.panasonicfa.com/prod.kme/cm/vc32c.html. This and other such visual checkers utilize high speed, high accuracy automatic recognition systems to perform a wide range of scanning for the presence or absence of surface mounted parts, offset, polarity and soldering conditions using high precision recognition and laser scanning units. For example, the viewing device 35 can provide high-speed precision inspection of certain conditions including chip mounting and solder joints on electric circuit boards through its image recognition camera (CCD camera) and applied laser technologies.

Figure 6:
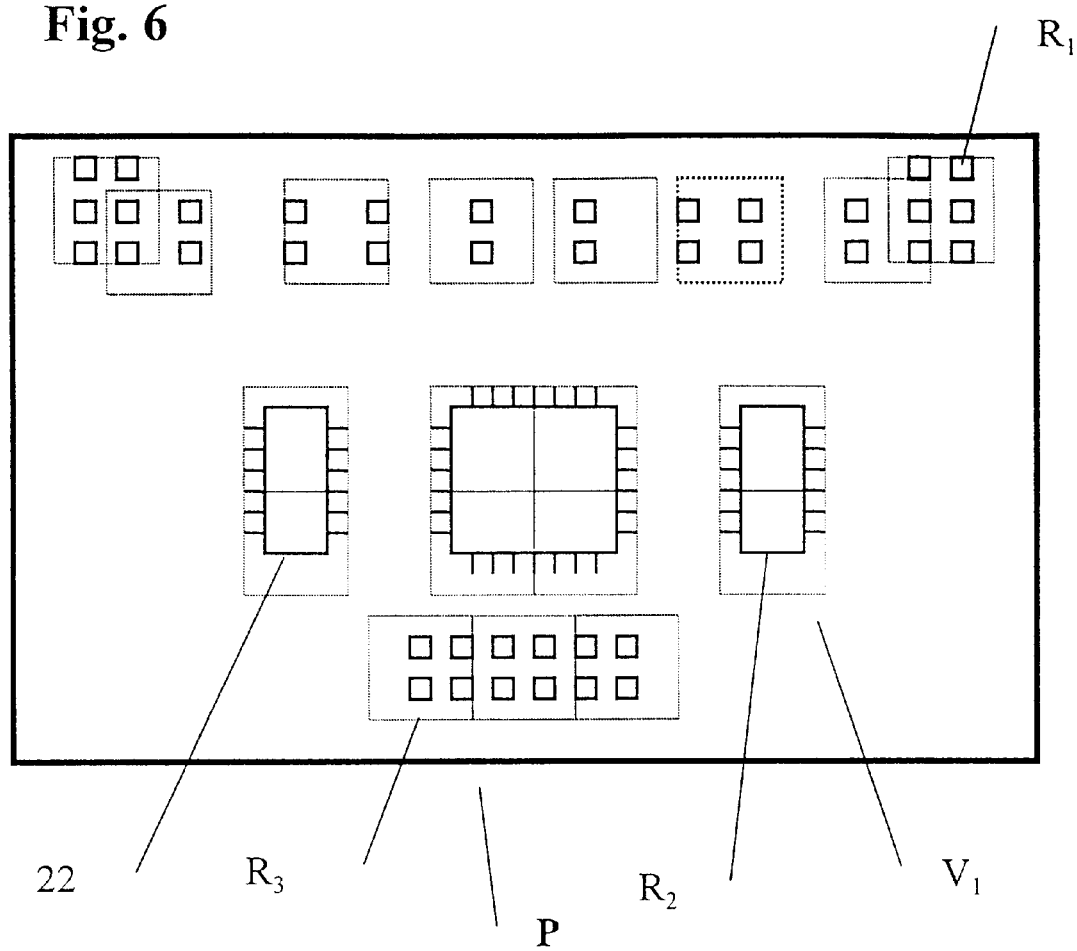
FIG. 6 is a schematic diagram of a reduced number of views for viewing regions of interest of FIG. 5 according to the present invention.

The viewing device 25 includes an image acquiring mechanism having a rectangularly shaped constrained viewing area 26. As illustrated in FIG. 6, the constrained viewing area 26 cannot view all of the regions of interest $R_n$ in a single view, and thus requires movement of the constrained viewing area 26 relative to the regions of interest $R_n$. Viewing devices having viewing areas of any polygonal shape can also be provided.

The viewing device 25 is utilized in various applications of automated visual inspection which typically compare data from a component being inspected such as a PCB with reference data. The data for the inspection generally is a series of images obtained by the viewing device 25. Each component to be inspected generally has certain tests associated with it during inspection. For example, a chip resistor may have three tests associated with it including two tests for the solder joints at each end and one for confirming the existence of the component. An inspection region or region of interest R is associated with each test which includes the feature under test. The inspection region is used to analyze and determine whether the feature being tested is functional.

The automated visual inspection apparatus can accommodate viewing devices including optical devices having a constrained viewing area and, alternately, viewing devices having a changeable viewing area. In the inspection of certain components, the regions of interest R may require different resolutions of the viewing device 25. The viewing device 25 provides for higher resolutions by zooming in thereby decreasing the footprint of the image or viewing area 26. Thus, the resolution, image size and viewing area 26 are varied depending on the test being performed for a particular component. The viewing area 26 is generally an order of magnitude larger than any of the individual regions of interest R. In embodiments changeable with viewing areas, the controller can include means for recognizing the size and configuration of the viewing area. For example, the viewing device 25 of FIG. 1 supports three magnification levels for viewing areas of different sizes and configurations.

Referring again to FIG. 1, the moving mechanism 30 is provided for moving one or both of the constrained viewing area 26 of the viewing device 25 and the regions of interest $R_n$ of the product P relative to one another according to a selected path of travel T. The selected path is from an ordered list of coordinates transmitted by the controller 40 to the moving mechanism 30. The moving mechanism 30 can be any mechanism, device or system which can move a product and/or an optical input device accordingly to a selected path. Suitable moving mechanisms include servomotor devices, mechanisms and robots, and other controllable devices known to one of skill in the art the details of which are not described herein.

In the embodiment of FIG. 1, the moving mechanism 30 moves the regions of interest $R_n$ relative to the constrained viewing area of the viewing device 25 for performing visual inspection. Alternatively, the moving mechanism 30 can move the viewing area 26 relative to the regions of interest $R_n$.

The moving mechanism 30 illustrated in FIG. 1 is capable of movement in two dimensions. The methods and apparatus of the present invention are illustrated with respect to visual inspections conducted in two dimensions. Alternatively, inspections in three dimensions can be undertaken with regions of interest identified by coordinates in an x-y-z axis utilizing z-axis motion as an alternative to magnification for various viewing requirements. In such embodiments, moving mechanisms can be utilized capable of movement in higher degrees of freedom.

The automated visual inspection apparatus 20 also includes a controller 40 which is operatively connected with the moving mechanism 30 and the image acquiring mechanism of the viewing device 25. The controller 40 can be provided as any visual inspection controller or processor and can be provided as a single processor or as multiple processors or other controllers.

The apparatus 20 includes means for performing a set covering on the regions of interest $R_n$ to select a number of views |V| needed to cover regions of interest $R_n$ in the constrained viewing area of the viewing device 25 illustrated in FIG. 1 as in the controller 40 (FIG. 6). The apparatus 20 also further includes means for performing a relaxed traveling salesman problem on the selected views V to select a desired path of travel T between the selected views V (FIG. 7), also illustrated in this embodiment in the controller 40. Referring still to FIG. 1, the apparatus 20, preferably in the controller 40, may further include means of generating and transmitting a selected path of travel T of an ordered list of coordinates generated by the set covering performing means and the traveling salesman performing means.

Still referring to FIG. 1, the automated visual inspection apparatus 20 may include or utilize user input devices 35, including a keyboard, display, touch-screen and/or pointing device, which can be used to receive input of solution criteria. Solution criteria can include a range of time and a range of aggressiveness. These user input devices 35 can be utilized to provide the controller 40 with a desired solution criteria including the time, aggressiveness and the like to be applied in minimizing or reducing the inspection time. The components of the apparatus 20 including the moving mechanism 30, controller 40, user input device 35, and viewing device 25 are illustrated as separate devices forming a system in the embodiment of FIG. 1. These components also can be provided combined in one or more devices.

Referring now to FIGS. 2–7, an embodiment of the operations of automated visual inspection according to the present invention is illustrated (Box 50). The methods, as described with respect to FIGS. 2–7, can utilize the apparatus described and illustrated in FIG. 1. The methods illustrated can reduce or preferably minimize the inspection time required for inspecting regions of interest $R_n$ of a product P with the viewing device 25 having a constrained viewing area 26 as described with respect to FIG. 1. The methods reduce or preferably minimize both the number of views |V| required to view all the regions of interest $R_n$ (Box 60) and the distance or path of travel T between those views, thus reducing the time of travel between the views (Box 70).

Figure 5:
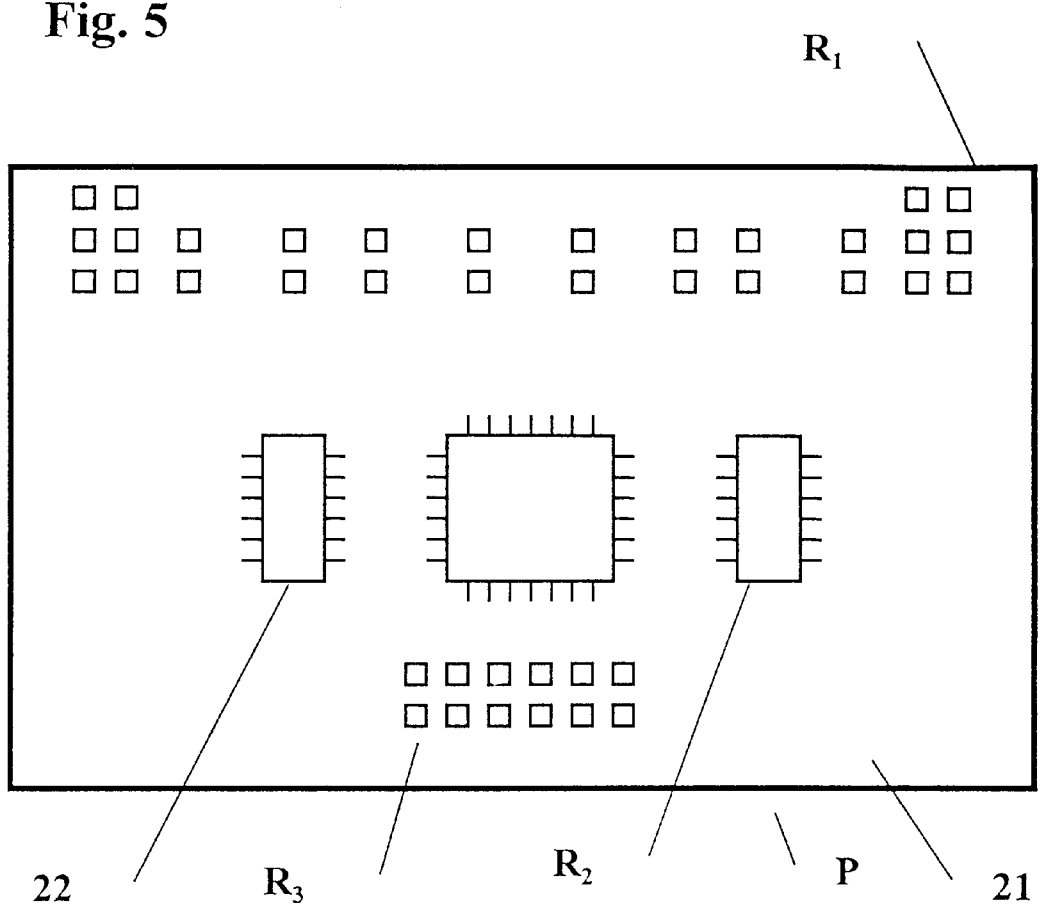
FIG. 5 is a schematic diagram of a product having regions of interest to be inspected.
Figure 7:
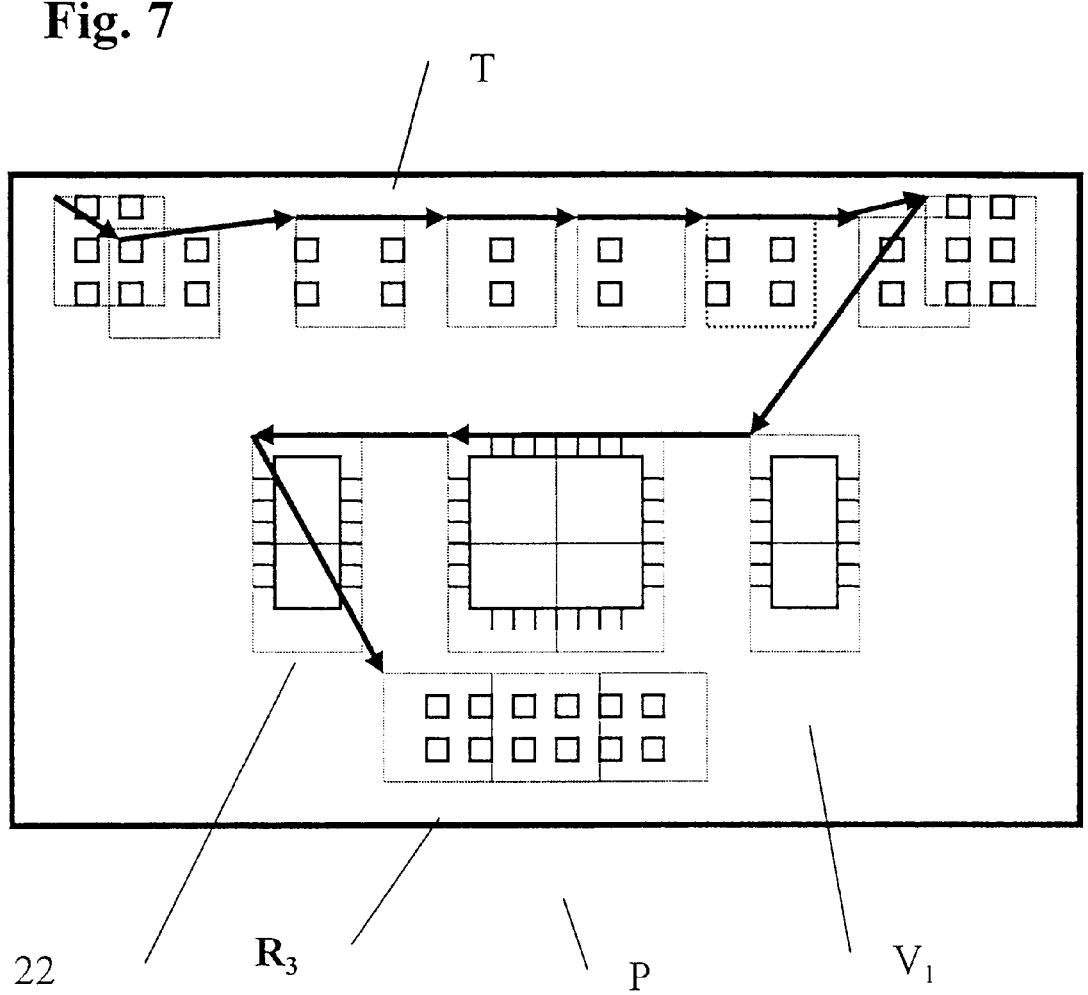
FIG. 7 is a schematic diagram indicating a selected path of travel of the selected views of FIG. 6 relative to the regions of interest.

Referring still to FIGS. 2 and 7, in solving, and preferably optimizing, the view minimization problem, a number of regions of interest $R_n$ are identified. As illustrated in FIGS. 5 and 6, a product P can have regions on interest $R_1, R_2, R_3$ which are grouped in clusters and not uniformly distributed throughout the product P. A single view from the constrained viewing area 26 cannot capture all of the regions of interest $R_n$. Thus, the regions of interest $R_n$ ($R_1, R_2, R_3$) are identified having known x,y coordinates (Box 52). These coordinates of the regions of interest $R_n$ are provided to the controller 40 by means known to one in the art.

As illustrated in FIG. 2, solution criteria can be identified which determine the type, range and level of solution desired (Box 54). These solution criteria can include the computation time for a solution, the aggressiveness of application of heuristics and other like factors for determining the level of solution or optimization of the solution. These solution criteria can be input by user input means 35 as described herein with respect to FIG. 1. With the desired time and aggressiveness or other solution criteria inputted, an optimization or solution to the view minimization problem is provided.

Figure 3:
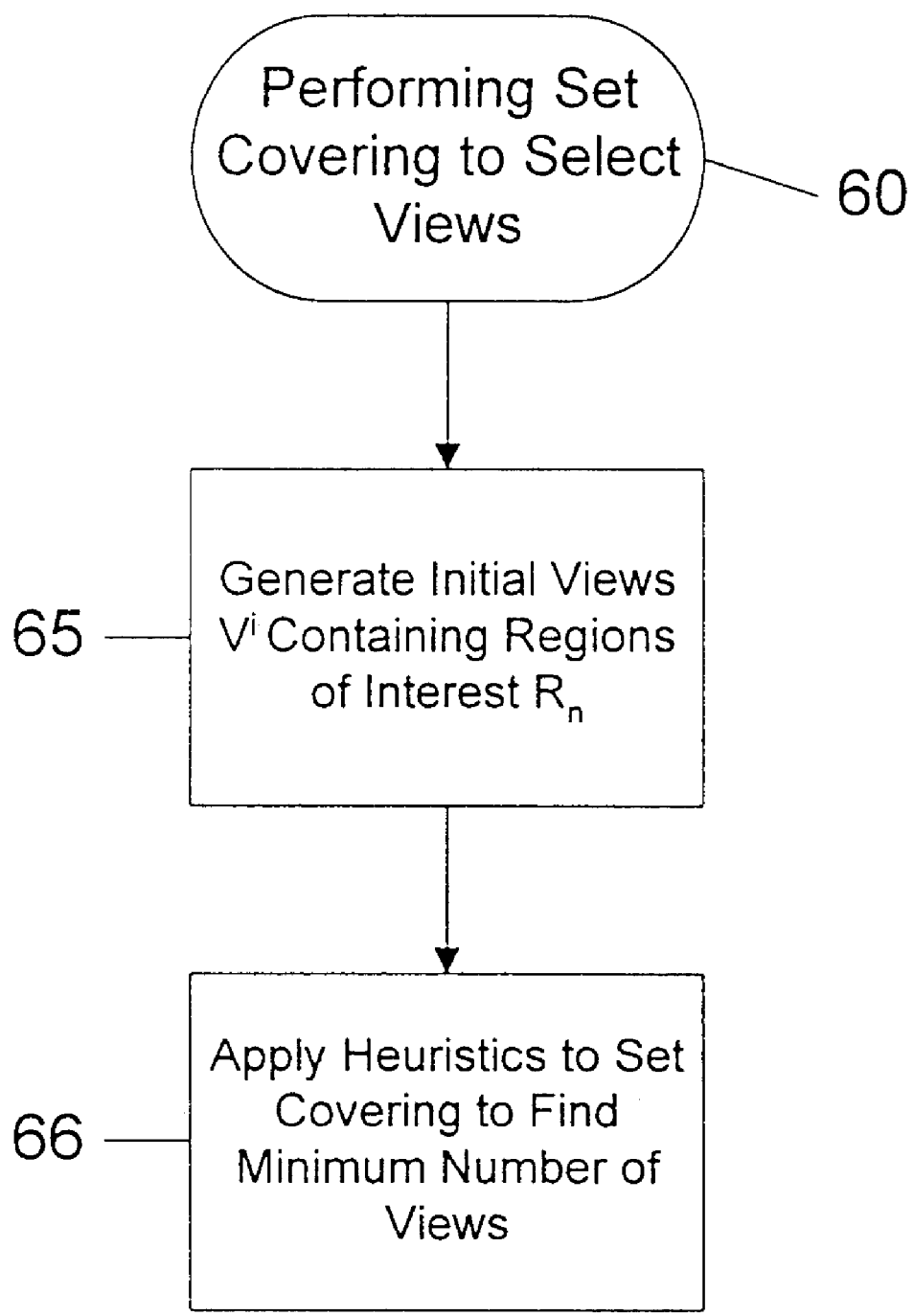
FIG. 3 is a detailed flow chart for applying the set covering problem for minimizing the number of views in an automated viewing inspection from FIG. 2.
Figure 4:
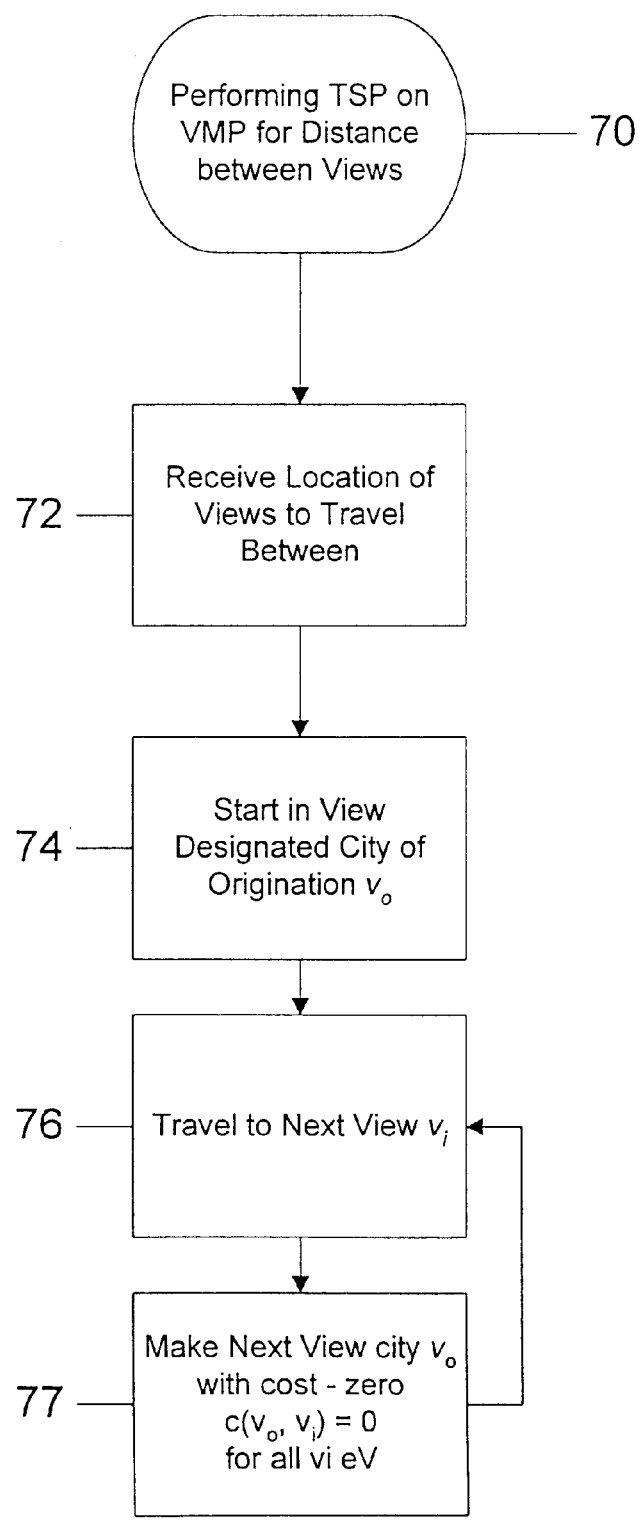
FIG. 4 is a flow chart of an aspect of the present invention of applying the traveling salesman problem to determine a desired path of movement between selected views.

Referring to FIG. 3, an initial number of views $V_i$ is defined utilizing two regions of interest whereby the two regions of interest defined the left most and top most sides of the view. Once these sides are determined, other regions of interest are located within the maximum distance equal to the image viewing area 26 of the viewing device 25. All of these regions of interest located in a viewing area 26 form a view. The possible maximum number of views is $N^2$ where N is the total number of regions of interest considered. The following Equation III can be utilized to generate an initial set of views V from the set O of the regions of interest.

---

Formula III:
V = Ø
Sort O by x
For each i ∈ O
    NEAREST = Ø
    For each j ∈ O
        If $(j_x-i_x<=w)$ AND $(i_y-j_y<=h)$
            NEAREST = NEAREST ∪ {j};
    For each j ∈ NEAREST
        If $(i_y<=j_y)$
            SUBSET = Ø
            For each K ∈ NEAREST
                If $(k_x>=i_x)$ AND $(k_y>=j_y)$ AND
                $(k_x+k_w-i_x<w)$ AND $(k_y+k_h-j_y<=h)$
                      SUBSET = SUBSET ∪ {k}
            V = V ∪ {SUBSET}
Return V
}
In Formula III, the terms:
V = Ø
    Sort O by x
    For each i ∈ O
places a region of interest in the west edge of the view and the terms:
NEAREST = Ø
    For each j ∈ O
        If $(j_x-i_x<=w)$ AND $(i_y-j_y<=h)$
            NEAREST = NEAREST ∪ {j};
collect the region of interest nearest to regions of interest. The term
    For each j ∈ NEAREST
        If $(i_y <= j_y)$
places a region of interest in the north edge of the view. Then, the term
        SUBSET = Ø
        For each K ∈ NEAREST
            If $(k_x>=i_x)$ AND $(k_y>=j_y)$ AND
            $(k_x+k_w-i_x<w)$ AND $(k_y+k_h-j_y<=h)$
                SUBSET = SUBSET ∪ {k}

--- selects the regions of interest with the distance of the size of the view. This is repeated as needed for the set of regions of interest O. (Box 65). Each of the initial views $V_i$ is sized corresponding to the actual size of the constrained viewing area 26 of the viewing device 25. A list of coordinates corresponding to these initial views $V_i$ is generated. Other methods of defining an initial number of views can be utilized. For example, a region of interest can be placed on the top left corner to form an initial view for each region of interest. A region of interest also can be placed in one or more initial views in any predetermined position in a view.

Figure 8:
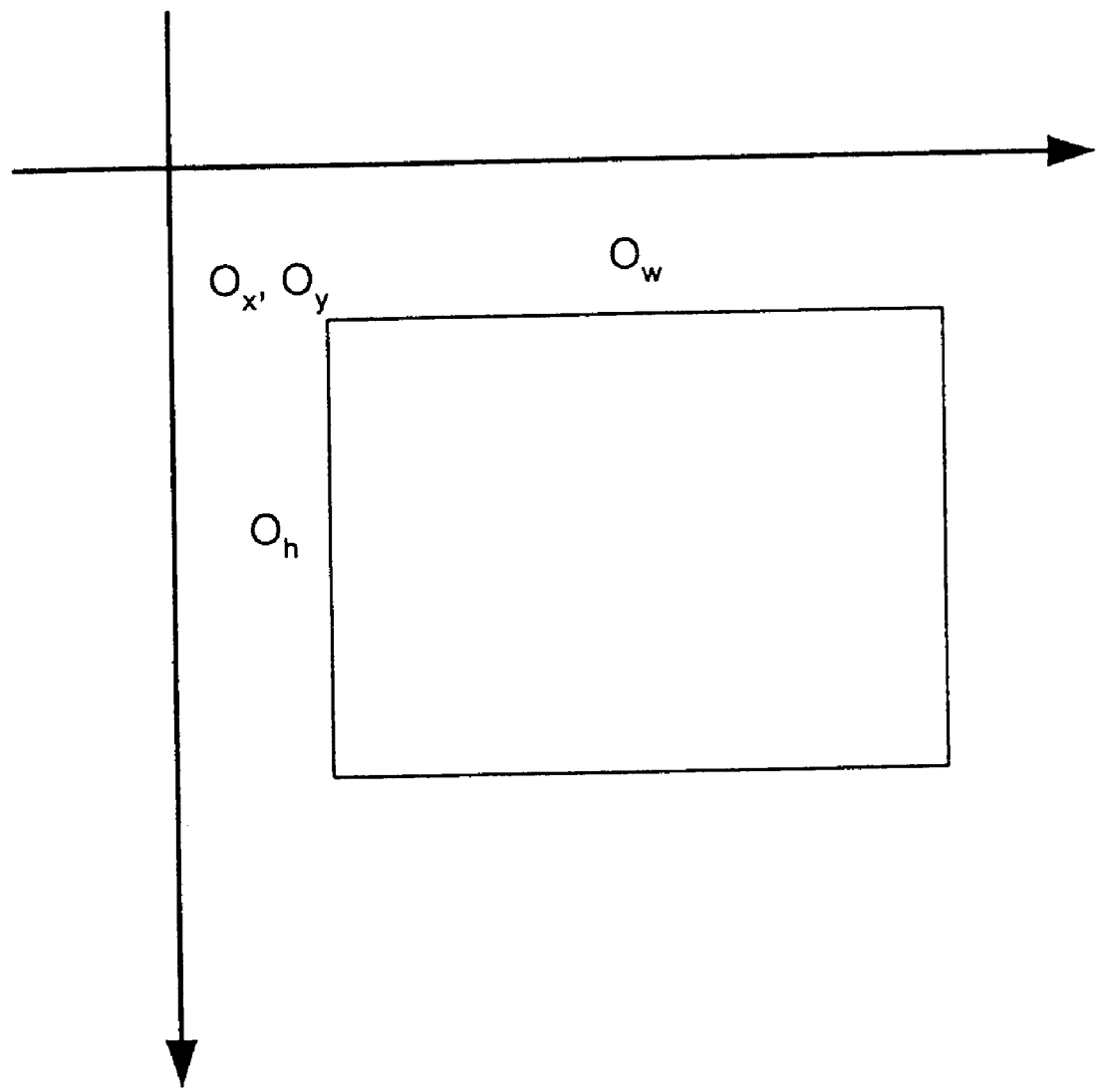
FIG. 8 is a graphic illustration of a rectangular object of interest used in the view minimization problem according to one embodiment of the present invention.

With reference to FIGS. 2, 3 and 8, the view minimization problem can be described as follows. An instance (O, w, h, a, c) of the view minimization problem (VMP) consists of a finite set O such that every element of O is an integer attribute 4-tuple $(O_x, O_y, O_w, O_h)$ which defines a rectangular object of interest. FIG. 8 illustrates graphically the rectangular object of interest. Specifically attributes $O_x$ and $O_y$ define the position of the rectangle's upper left-hand corner, while $O_w$ and $O_h$ define its width and height respectively. A view is constrained by the integer value w, which specifies its maximum width, and the integer value h, which specifies its maximum height. The two remaining arguments are used to determine the cost in time of viewing all objects of interest. Specifically, the constant a indicates the time required to acquire a view, while the function $c(v_1, v_2)$ calculates the time required to travel between views $v_1, v_2$.

As described with respect to Box 65, an ordered set of views V, also consisting of 4-tuples that define a rectangle, covers all objects of interest in O if for every object of interest o∈O, if there exists a v∈V such that:

$v_x \leq o_x$
$v_y \leq o_y$
$v_w \leq w$
$v_h \leq h$
$v_x + v_w \geq o_x + o_w$
$v_y + v_h \geq o_y + o_h$ The view minimization problem is therefore described as finding a set of views V whose members inspect all objects of interest according to Equation I. In solving or optimizing the view minimization problem as described, a view minimization problem is transformed into a set covering problem and a traveling salesman problem (Boxes 60 and 70).

Referring still to FIGS. 2 and 3, the view minimization problem is first translated into a set covering (Box 60). The set covering problem is an optimization problem often used to model source selection problems. The set covering problem generalizes the NP vertex cover problem and is therefore NP hard. The set covering problem is known to one in the art and additional disclosure of the set covering problem can be found in T. Grossman et al., *Computational Experience with Approximation Algorithms for the Set Covering Problem*, p. 1 (Apr. 18, 1996) and in C. Reeves, *Modern Heuristic Techniques for Combinatorial Problems*, Chp. 1, Introduction, p. 2 (Halstead Press 1993), the disclosure of each is hereby incorporated by reference. The set covering problem can be described wherein an instance (X, F) of the set covering problem consists of a finite set X and a family F of subsets of X, such that every element of X belongs to at least one subset of F:

$$X = \cup_{S \in F} S$$

A subset SEF covers its elements. The problem is to find a minimum-size subset CEF whose members cover all of X:

$$X = \cup_{S \in C} S$$

An example of the set covering problem is as follows. X represents a set of needed skills and a given set of people is presupposed. A committee is sought to be formed containing as few people as possible, such that for every requisite skill in X, there is a member of the committee with that skill.

Minimizing the views |V| can be reduced to an instance (X,F) of the set covering problem described with respect Formula II:

Let X=O    II.

wherein O=the regions of interest;
Let F={i:i, jEO and i≠j and
$i_x - j_x + j_w < w$ and
$i_y - j_y + j_h < h$ and
$i_x \leq j_x$ and
$i_y \leq j_y$}

Because F is defined to contain every possible view, determining the minimal set cover must therefore determine the minimum number of views. The total number of possible views is very large ($O(2^{|X|})$). Known heuristics, as described herein, can then be applied to the set covering problem to provide a desired number of views, preferably a minimum number, which will include all regions of interest $R_n$ in a product to be inspected (Box 66).

Having determined the number of views |V| required to view the regions of interest $R_n$, the view minimization problem is further translated into a traveling salesman problem to reduce the distance of travel required to move between each of the selected views V (Box 70). The traveling salesman problem (TSP) is a known optimization problem that often arises when minimizing traveling distances. It generalizes the NP-complete hamiltonian-cycle problem and is therefore NP-hard. In the traveling salesperson problem, a salesperson must visit n cities. There is a cost c(i, j) to travel from city i to city j, and the salesman wishes to make the tour whose total cost is minimum. The total cost C(A) for tour A is the sum of the $$C(A) = E^{(u,v) \in A} c(u,v)$$

Known heuristic strategies exist to optimize the TSP problem. The traveling salesman problem is a well known problem as explained in E. Kosiba et al., *Discrete Event Sequencing as a Traveling Salesman Problem, Computers in Industry* 19 (1992), pp. 317–327 and C. Reeves, *Modern Techniques for Combinatorial Problems*, Chp. 1, Introduction, pp. 7–10 (Halstead 1993), the disclosure of each is hereby incorporated by reference herein.

Referring to FIGS. 2 and 4, minimizing the distance between views (i.e. $E^{i<|V|} c(V_{i+1}, V_i)$) is a relaxed version of the traveling salesperson problem (Box 70). In this variant of the traveling salesman problem, the salesperson is required to visit every city, but is not required to return to his or her city of origination to form a tour (FIG. 4, Boxes 74, 76, 77). However, by introducing a city $v_o$ that has cost of zero to every other view (i.e. $c(v_o, v_i) = 0$ for all $V_i \in V$) and requiring it to be the city of origination, this relaxed problem can be made equivalent to the classical traveling salesman problem (Box 77).

Known heuristics, as described herein, are then applied to the traveling salesman operation to reduce, and preferably minimize, the distance of travel between the views (Box 70). The simulated annealing heuristic is preferably applied to the traveling salesman operation in the present embodiment. Other suitable heuristics and algorithms for optimizing or solving the set covering, as well as the traveling salesman problem, are known to one in the art and include simulated annealing, tabu search, genetic algorithms, neural networks, greedy algorithm, local neighborhood search, problem-specific heuristics and other heuristics.

Optimizing by simulated annealing has been researched widely. An optimization by the simulated annealing method is described by S. Kirkpatrick et al., *Optimization by Simulated Annealing, Computer Science/Engineering Technology*, RC 9355 (#41093), pp. 1–73, pp. 38–42, Apr. 2, 1982, the disclosure of which are incorporated by reference herein. As previously mentioned, particular algorithms which can be utilized to optimize the set covering problem can be seen in C. Reeves, *Modern Heuristic Techniques for Combinatorial Problems*, pp. 185, 249–55, 259–65, 268–69, 275–79 (Halstead 1993) and T. Grossman et al., *Computational Experience with Approximation Algorithms for the Set Covering Problem*, pp. 1–16 (Apr. 18, 1996), the disclosure of each of which is incorporated by reference herein (Box 60). Other examples of applying heuristics, such as neural networks to combinatorial problems can be seen in J. J. Hopfield and P. W. Tank, "*Neural Computation of Decisions in Optimization Problems,*" (Biol. Cybern. 52, 141–152 (1985)), which is incorporated by reference herein.

The set covering problem, as well as the traveling salesman problem also can be optimized using composite heuristics wherein two or more heuristics are applied together, such as the simulated annealing and neural networks together. For example, in the embodiment illustrated in FIGS. 2–7, a composite heuristic is applied. A greedy algorithm is applied to obtain a ninety percent (90%) solution in a relatively short time period. A slower algorithm including the simulated annealing or alternatively a neural network, is then applied to further optimize the solution. In this embodiment, a composite greedy and simulated annealing algorithm are preferably applied respectively to the set covering and the traveling salesman operations.

The result of applying the set covering problem (Box 60) and the traveling salesman problem (Box 70) is a selected path of travel T comprising an ordered list of coordinates which controls the movement of the inspection device to minimize the inspection time by minimizing the number of views inspected and the time of travel between the views (Boxes 81 and 82).

Referring to FIGS. 5–7, the results of applying heuristics to a set covering and a traveling salesman approach are depicted. In FIG. 5, a product P is depicted as a printed circuit board 21 having components 22 mounted on the surface of the board 21. Certain areas of product P are depicted as regions of regions of interest $R_1$, $R_2$, $R_3$, of which only a portion are labeled with reference numbers. These regions of interest $R_1$, $R_2$, $R_3$ are distributed around the surface of the board 21.

Referring to FIG. 6, after the operations of performing a set covering and applying heuristics to the initial views $V_i$ (Box 60), a reduced, and preferably minimum number of views $|V_n|$ are depicted containing all of the regions of interest $R_n$ ($R_1$, $R_2$, $R_3$). Referring to FIG. 7, after the operations described with respect to performing a traveling salesman, including applying heuristics, described herein (Box 70), a selected path of travel T corresponding to an ordered list of coordinates generated by the operations is provided. The selected path T corresponds to coordinates for moving the constrained viewing area relative to the regions of interest $R_n$ for visual inspection. The constrained viewing area 26 of the viewing device 25 is then moved relative to the regions of interest according to the selected path of travel T (Box 80).

In addition to the apparatus and methods of visual inspection, computer program products for controlling the automated visual inspection of the regions of interest of the product utilizing the automated visual inspecting device according to the present invention are provided. The computer program products have a computer readable storage medium having computer readable code means embodied in the medium. The computer readable program code means include computer readable program code means for performing a set covering on regions of interest applying a heuristic thereto to select a number of views, preferably a minimum number of views, for viewing the regions of interest in a constrained viewing area as described herein. These computer readable program code means for performing a set covering include means utilizing the equations described with respect to the apparatus and methods of automated visual inspection described herein, the discussion of which is hereby incorporated by reference.

Also, the computer program products include computer readable program code means for performing a relaxed traveling salesman operation and for applying heuristic to the traveling salesman operation for the selected views to select the desired path of movement between the selected views.

These heuristic applying means for both the set covering problem and the traveling salesman operations apply heuristics such that the inspection time is minimized by minimizing the time required to select a number of views $|V|$ and minimum time required to travel between views according to Formula I.

$$a*|V|+E^{i-|V|}c(V_{i+1}, V_i) \tag{I}$$

where a is the time required to process a single view, and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem.

The computer program products also can be provided with computer readable program code means for generating an order list of coordinates for controlling the relative movement between an optical input device and regions of interest to be inspected. The computer readable program code means generate the ordered list of coordinates corresponding to the coordinates of the views selected by the set covering computer readable program codes means and the coordinates of the path of travel between the selected views generated by the traveling salesman problem performing computer readable program code means. The computer program products further can be provided with computer readable program code means for controlling the relative movement between the constrained viewing area of the optical input device and the regions of interest of the product according to the ordered list of coordinates generated.

The present invention can produce results that are superior to those of the existing method and represents a breakthrough since visual inspection machines are typically very expensive and bottleneck production when poorly optimized. Second, the methods, apparatus and computer program products of the present invention can utilize existing heuristic algorithms which do not require problem specific information which can reduce development costs.

As will be appreciated by those of skill in this art, the preceding examples are provided, not to limit or define the scope of the present invention, but to illustrate the nature of the present invention and possible uses for teaching of the present invention. These examples may be modified in different ways still obtaining the benefits of the teachings of the present invention. In the drawings, specification and examples, there have been disclosed typical preferred embodiments of the invention and, all though specific terms are employed, these terms are used in a generic and descriptive sense only and not for the purposes of limitation, the scope of the invention being set forth in the following claims.

We claim:

1. A method of automated visual inspection of regions of interest of a product utilizing an automated visual inspection device including a viewing device having a viewing area for acquiring images of regions of interest of a product being inspected, wherein said viewing area is constrained in size and has a predetermined geometric shape, and wherein said method comprises the steps of:

selecting a plurality of views for viewing the regions of interest in the constrained viewing area, wherein said selecting step comprises:
   generating an initial set of views wherein every region of interest is included in at least one view based on the constraints of the viewing area and the predetermined geometric shape of the viewing area and wherein the regions of interest are capable of being included in more than one view of the initial set of views; and
   performing a set-covering on the initial set of views from said generating step to select a plurality of views; and
   performing relaxed traveling salesman problem on the selected plurality of views to select the path of movement between the selected plurality of views.

2. A method of automated visual inspection as defined in claim 1, further comprising the step of:
   moving the constrained viewing area of the viewing device relative to the regions of interest based upon the selected path of movement.

3. A method of automated visual inspection as defined in claim 1, wherein said performing a set-covering step involves applying a heuristic to the set-covering and said performing relaxed traveling salesman problem step involves applying a heuristic to the relaxed traveling salesman problem such that said performing a set-covering step and said performing relaxed traveling salesman problem step minimize the time required to inspect the regions of interest by selecting a minimized number of views $|V|$ for viewing the regions of interest in the constrained viewing area and a minimized distance of movement between the selected number of views according to Formula (I):

$$a*|V|+E^{i<|V|}c(V_{i+1}, V_i) \qquad \text{(I)}$$

where a is the time required to process a single view, and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem.

4. A method of automated visual inspection as defined in claim 3, wherein said performing relaxed traveling salesman problem step further comprises requiring the constrained viewing area to visit every city v in a tour but not requiring the viewing area to return to the city v of origination to form a tour and utilizing a city $v_o$ having a cost equal to zero to alternating views of the viewing area such that $c(v_o, v_i)=0$ for all $v_{i\epsilon}V$ and requiring the city $v_o$ to be the city of origination in applying at least one said heuristic to solving said traveling salesman problem.

5. A method of automated visual inspection as defined in claim 3, wherein the following step is performed prior to the selecting step:
   accepting input of a solution criteria including at least one of a level of time and aggressiveness for controlling both said performing a set-covering step and said performing relaxed traveling salesman problem step based on said solution criteria such that both of the performing steps perform according to the accepted input of solution criteria.

6. A method of automated visual inspection as defined in claim 1, wherein said performing a set-covering step further comprises applying a heuristic to the set-covering to select a minimized number of views for viewing the regions of interest in the constrained viewing area; and
   wherein said performing relaxed traveling salesman problem step further comprises applying a heuristic to the relaxed traveling salesman problem to select a minimized distance of movement between the views selected by said performing a set-covering step.

7. A method of automated visual inspection of a product as defined in claim 1 wherein said performing a set-covering step further comprises applying a heuristic to the set-covering to produce a set of views $|V|$ which cover all of the regions of interest and wherein said second performing relaxed traveling salesman problem step further comprises applying a heuristic to minimize the distance of movement between the views $|V|$.

8. A method of automated visual inspection as defined in claim 7, wherein said performing a set-covering step further comprises performing an instance $(X,F)$ of the set covering problem according to Formula II:

$$\text{Let } X=O \qquad \text{II.}$$

wherein O=the regions of interest;
Let $F=\{i:i\epsilon O \text{ and } i\neq j$
  $i_x-j_x+j_w$ and
  $i_y-j_y+j_h$ and
  $i_x\leq j_x$ and
  $i_y\leq j_y\}$.

9. A method of automated visual inspection as defined in claim 7, wherein said generating an initial set of views step comprises generating an initial set of Views $|V|$ from the set O of regions of interest according to Formula III:

III.
$V = \emptyset$
Sort O by x
For each $i \epsilon$ O
   NEAREST = $\emptyset$
   For each $j \epsilon$ O
     If $(j_x-i_x<=w)$ AND $(i_y-j_y<=h)$
       NEAREST = NEAREST $\cup \{j\}$;
   For each $j \epsilon$ NEAREST
If$(i_y <= j_y)$
   SUBSET = $\emptyset$
   For each $K \epsilon$ NEAREST
     If $(k_x>=i_x)$ AND $(k_y>=j_y)$ AND
     $(k_x+k_w-i_x<w)$ AND $(k_y+k_h-j_y<=h)$
       SUBSET = SUBSET $\cup \{k\}$
   $V = V \emptyset \{SUBSET\}$
Return V.

10. An apparatus for automated visual inspection of regions of interest of a product comprising:
   a viewing device having an image acquiring mechanism including an image acquiring viewing area configured to view regions of interest of a product, wherein said image acquiring viewing area of said image acquiring mechanism has a constrained size and a predetermined geometric shape;
   means for moving said constrained viewing area of the viewing device relative to the regions of interest;
   means for generating an initial set of views wherein every region of interest is included in at least one view based on the constraints of the viewing area and the predetermined geometric shape of the viewing area, and wherein the regions of interest are capable of being included in more than one view of the initial set of views;
   means for performing a set-covering on the initial set of views to select a number of views for viewing the regions of interest in the constrained viewing area; and
   means for performing a relaxed traveling salesman problem on the selected number of views to select a path of movement between the selected number of views; and
   wherein the moving means is responsive to the relaxed traveling salesman problem to move along the selected path of movement.

11. An apparatus for automated visual inspection as defined in claim 10, wherein said set-covering performing means further comprises means for applying a heuristic to the set-covering and said relaxed traveling salesman problem performing means further comprises means for applying a heuristic to the relaxed traveling salesman problem, such that said set-covering performing means and said relaxed traveling salesman problem performing means minimize the time required to inspect the regions of interest by selecting a minimized number of views and a minimized distance of movement between the selected number of views according to Formula (I):

$$a*|V|+E^{i<|V|}c(V_{i+1}, V_i) \quad (I)$$

where a is the time required to process a single view, and where $c(V_{i+1}, V_i)$ is the cost of moving from the $i^{th}$ view $v_i$ to the next $(i+1)^{th}$ view $v_{i+1}$ in the sequence that is obtained from the solution of the traveling salesman problem.

12. An apparatus for automated visual inspection as defined in claim 11, wherein said relaxed traveling salesman problem performing means further comprises means for utilizing a city $v_o$ having a cost equal to zero with alternating views such that $c(v_o, v_i)=0$ for all $v_{i\in}V$ and requiring the city $v_o$ to be the city of origination in said applying a heuristic means to said traveling salesman problem.

13. An apparatus for automated visual inspection of regions of interest as defined in claim 11, further comprising solution criteria selection means for selecting solution criteria of at least one of a level of time and aggressiveness for controlling both said set-covering performing means and said relaxed traveling salesman problem performing means based on said solution criteria such that said set-covering performing means and said relaxed traveling salesman problem performing means perform according to the selected solution criteria.

14. An apparatus for automated visual inspection as defined in claim 10, wherein said set-covering performing means further comprises means for applying a heuristic to the set-covering to select a minimum number of views for viewing the regions of interest in the constrained viewing area; and wherein said relaxed traveling salesman problem performing means further comprises means for applying a heuristic to the relaxed traveling salesman problem to select a minimum distance of movement between the views selected by said set-covering performing means.

15. An apparatus for automated visual inspection as defined in claim 10, wherein said set-covering performing means further comprises means to produce a set of views |V| which cover all of the regions of interest and wherein said traveling salesman problem performing means further comprises means to minimize the distance to move between the views V.

16. An apparatus for automated visual inspection as defined in claim 15, wherein said set-covering performing means further comprises means for reducing to an instance (X,F) of the set covering according to Formula II:

$$\text{Let } X=O \quad \text{II.}$$

wherein O=the regions of interest;

Let $F=\{i:i, j\in O \text{ and } i\neq j$
$i_x-j_x+j_w<w$ and
$i_y-j_y+j_h<h$ and
$i_x\leq j_x$ and
$i_y\leq j_y\}$.

17. An apparatus for automated visual inspection as defined in claim 10 wherein said means for generating an initial set of views which cover all regions of interest further comprises means for generating an initial set of views |V| for set O of the regions of interest according to Formula III:

III.
$V = \emptyset$
Sort O by x
For each $i \in O$
    NEAREST = $\emptyset$
    For each $j \in O$
        If $(j_x-i_x<=w)$ AND $(i_y-j_y<=h)$
            NEAREST = NEAREST $\cup \{j\}$;
    For each $j \in$ NEAREST
If($i_y <= j_y$)
    SUBSET = $\emptyset$
    For each $K \in$ NEAREST
        If $(k_x>=i_x)$ AND $(k_y>=j_y)$ AND
        $(k_x+k_w-i_x<w)$ AND $(k_y+k_h-j_y<=h)$
            SUBSET = SUBSET $\cup \{k\}$
    $V = V \cup \{SUBSET\}$
Return V.

18. A computer program product for controlling automated visual inspection of regions of interest of a product utilizing an automated visual inspection device including a viewing device for acquiring images of regions of interest being inspected, wherein said viewing device has a viewing area that is constrained in size and has a predetermined geometric shape, and wherein the computer program product comprises:

a computer readable storage medium having computer readable program code means embodied in said medium, said computer-readable program code means comprising:

computer-readable program code means for generating an initial set of views wherein every region of interest is included in at least one view based on the constraints of the viewing area and the predetermined geometric shape of the viewing area, and wherein the regions of interest are capable of being included in more than one view of the initial set of views;

computer-readable program code means for performing a set-covering on the initial set of views to select a number of views for viewing the regions of interest in the constrained viewing area; and computer-readable program code means for performing a relaxed traveling salesman problem on the selected number of views to select a path of movement between the selected number of views.

19. A computer program product as defined in claim 18, wherein said computer-readable program code means further comprises:

computer-readable program code means for generating a path of movement corresponding to an ordered list of coordinates generated from said set-covering computer-readable program code means and said traveling salesman performing computer-readable program code means; and computer-readable program code means for controlling movement of the constrained viewing area of the viewing device relative to the regions of interest according to the selected path of movement.

20. A computer program product as defined in claim 18, wherein said set-covering performing computer-readable program code means further comprises computer-readable program code means for applying a heuristic to the set-covering; and wherein said traveling salesman problem performing computer-readable program code means further comprises computer-readable program code means for applying a heuristic to the relaxed traveling salesman problem;

such that said set-covering and said traveling salesman problem performing computer-readable program code means minimize the time required to inspect the regions of interest by selecting a minimized distance of movement between the selected number of views according to Formula (I):

$$a*|V|+E^{i-|V|}c(V_{i+1}, V_i) \qquad (I)$$

where a is the time required to process a single view, and where $c(V_{i+1}, V_j)$ is the cost of moving from the $i^{th}$ view $v_i$ to the next $(i+1)^{th}$ view $v_{i+1}$ in the sequence that is obtained from the solution of the traveling salesman problem.

21. A computer program product as defined in claim 20, wherein said relaxed traveling salesman problem performing computer-readable program code means further comprises computer-readable program code means for utilizing a city $v_o$ having a cost equal to zero with alternating views such that $c(v_o, v_i)=0$ for all $v_i \epsilon V$ and requiring the city $v_o$ to be the city of origination in applying said a least one heuristic to said traveling salesman problem.

22. A computer program product as defined in claim 20, wherein said computer readable program code means further comprises:

computer readable program code means for accepting input of solution criteria including at least one of a level of time and aggressiveness for controlling the heuristic applying means.

23. A computer program product as defined in claim 18, wherein said set-covering performing computer-readable program code means further comprises computer-readable program code means for applying a heuristic to the set-covering to select a minimum number of views for viewing the regions of interest in the constrained viewing area; and wherein said relaxed traveling salesman problem performing computer-readable program code means further comprising computer-readable program code means for applying at least a one heuristic to the relaxed traveling salesman problem on the selected views to select the minimum distance of the path of movement between the views selected by the set-covering performing computer-readable program code means.

24. A computer program product as defined in claim 23, wherein said computer readable program code means for performing a set-covering further comprises computer readable program code means for performing an instance (X,F) of the set covering according to Formula II:

$$\text{Let } X = O \qquad \text{II.}$$

wherein O=the regions of interest;

Let $F = \{i:i, j \epsilon O \text{ and } i \neq j$ $i_x - j_x + j_w < w$ and $i_y - j_y + j_h < h$ and $i_x \leq j_x$ and $i_y \leq j_y \}$.

25. A computer program product as defined in claim 18, wherein said computer-readable program code means for generating an initial set of views comprises means for generating an initial set of views |V| for the set O of the regions of interest according to Formula III:

III.
```
V = Ø
Sort O by x
For each i ϵ O
    NEAREST = Ø
    For each j ϵ O
        If (jx-ix<=w) AND (iy-jy<=h)
            NEAREST = NEAREST ∪{j};
    For each j ϵ NEAREST
If(iy <= jy)
    SUBSET = Ø
    For each K ϵ NEAREST
        If (kx>=ix) AND (ky>=jy) AND
        (kx+kw-ix<w) AND (ky+kh-jy<=h)
            SUBSET = SUBSET ∪ {k}
    V = V Ø {SUBSET}
Return V.
```

* * * * *

UNITED STATES PATENT AND TRADEMARK OFFICE
CERTIFICATE OF CORRECTION

PATENT NO. : 6,023,680
DATED : February 8, 2000
INVENTOR(S) : Wooster, et al.

It is certified that error appears in the above-identified patent and that said Letters Patent is hereby corrected as shown below:

Title page, item [73], Assignee "Panasonic Technologies, Inc., Durham, N.C." should read --Matsushita Electric Industrial Co., Ltd., Osaka, Japan--.

Column 3, line 26, in Formula I, "E" should read --$\Sigma$--.

Column 4, line 49, in Formula I, "E" should read --$\Sigma$--.

Column 5, line 16, in Formula I, "E" should read --$\Sigma$--.

Column 7, line 1, in Formula I, "E" should read --$\Sigma$--; line 11, "E" should read --$\Sigma$--.

Column 11, line 52, "E" should read --$\in$--.

Column 12, line 13, "$E^{(u,v) \in A}$" should read --$\Sigma_{(u,v) \in A}$--; line 23, "E" should read --$\Sigma$--.

Column 14, line 1, "E" should read --$\Sigma$--.

Column 15, line 20, in Formula (I), "E" should read --$\Sigma$--; line 33, "vjeV" should read -- $v_j \in V$ --.

Column 16, in Formula II, line 7, after "i:i" insert --, j--; line 8, after "$j_w$" insert --< w --; line 9, after "$j_h$" insert --< h --; in Formula III, line 31, "0" should read --$\cup$--.

UNITED STATES PATENT AND TRADEMARK OFFICE
CERTIFICATE OF CORRECTION

PATENT NO. : 6,023,680
DATED : February 8, 2000
INVENTOR(S) : Wooster, et al.

It is certified that error appears in the above-identified patent and that said Letters Patent is hereby corrected as shown below:

Column 17, in Formula (I), line 7, "E" should read --$\Sigma$--; line 18, "$v_j \epsilon V$" should read -- $v_i \in V$ --.

Column 18, in Formula III, line 16, "0" should read --$\cup$--.

Column 19, in Formula (I), line 8, "E" should read --$\Sigma$--.

Column 19, line 20, "a" should read --at--; line 37, "comprising" should read --comprises--.

Column 20, line 39, "0" should read --$\cup$--.

Signed and Sealed this

Fourth Day of July, 2000

Q. TODD DICKINSON

*Attest:*

*Attesting Officer*     *Director of Patents and Trademarks*